United States Patent [19]

Urakami et al.

[11] Patent Number: 5,307,199
[45] Date of Patent: Apr. 26, 1994

[54] OPTICAL APPARATUS

[75] Inventors: Tsuneyuki Urakami; Shinichiro Aoshima; Yutaka Tsuchiya, all of Hamamatsu, Japan

[73] Assignee: Hamamatsu Photonics K.K., Hamamatsu, Japan

[21] Appl. No.: 735,792

[22] Filed: Jul. 25, 1991

[30] Foreign Application Priority Data

Jul. 27, 1990 [JP] Japan .................. 2-200971
Jul. 27, 1990 [JP] Japan .................. 2-200972

[51] Int. Cl.$^5$ .......................... G02F 1/01; G02F 1/03
[52] U.S. Cl. ........................ 359/244; 359/299; 385/5
[58] Field of Search ............. 359/244, 299, 108, 94, 359/95, 285, 286; 385/5, 22

[56] References Cited

U.S. PATENT DOCUMENTS

| | | | |
|---|---|---|---|
| 3,395,961 | 8/1968 | Ready | 359/299 |
| 4,084,182 | 4/1978 | Maiman | 358/62 |
| 4,290,672 | 9/1981 | Whitefield | 359/285 |
| 4,496,222 | 1/1985 | Shah | 359/244 |
| 4,772,785 | 9/1988 | Cheng et al. | 359/299 |
| 4,880,296 | 11/1989 | Ditman | 359/244 |
| 4,982,152 | 1/1991 | Takahashi et al. | 359/299 |
| 5,034,683 | 7/1991 | Takashi et al. | 359/244 |
| 5,126,874 | 6/1992 | Alfano et al. | 359/244 |

FOREIGN PATENT DOCUMENTS 468794 1/1992 European Pat. Off. .
2178262 2/1987 United Kingdom .

OTHER PUBLICATIONS

Lattes et al, IEEE J. Z. E., vol. QE-19, #11, pp. 1718–1723, Nov. 1983; abstract only supplied.
Y. Li et al, "Ultrafast all-optical deflection based on an induced area modulation in nonlinear materials", Optics Letters, vol. 16, No. 6, Mar. 15, 1991, New York, pp. 438–440.
T. Kobayashi et al, "Generation of Shaped Optical Pulses in the Sub-ns to ps Region by Using a Fast Elektrooptic Deflector", vol. 15, No. 9, Sep. 1979, New York, pp. 110–120.
Kobayashi et al, "Generation of Arbitrarily Shaped Optical Pulses in the Subanosecond to Piosecond Region Using Fast Electooptic Deflector", IEEE Journal of Quantam Electronics, vol. QE-16, No. 2, Feb. 1980.
R. T. Eagles et al, "Single-Frame and Double-Frame Operation of a Picosecond Framing Camera", Optics Communications, vol. 57, No. 6, Apr. 15, 1986, pp. 423–428.
Kinoshita et al, "Piosecond Electronic Framing Camera", SPIE vol. 693 High Speed Photography, Videography and Photonics IV (1986) pp. 2–8.

Primary Examiner—Nelson Moskowitz
Attorney, Agent, or Firm—Cushman, Darby & Cushman

[57] ABSTRACT

The optical apparatus includes first and second deflection members, a mask, a pumping light source, and a controller. The first and second deflection members are formed of nonlinear optical material whose refractive index is changed upon light radiation. The mask is arranged on an optical path extending from a front side of the first deflection member to a rear side of a second deflection member. The mask has a predetermined transmission pattern. The pumping light source radiates first and second beams on predetermined regions of the first and second deflection members. This changes the refractive indices of the predetermined regions to bend the optical path. The controller variably controls the intensity of the first and second beams.

31 Claims, 8 Drawing Sheets $n_1 > n_2 > n_3$
$\theta_1 > \theta_2 > \theta_3$

OPTICAL APPARATUS

BACKGROUND OF THE INVENTION

1. Field of the Invention

The present invention relates to an optical apparatus for an all-optical processing for an optical input such as an optical image, an optical signal or the like and, more particularly, to an optical apparatus suitably used for an ultrafast optical waveshaping, an ultrafast optical gate processing and the like.

2. Related Background Art

There is no conventional apparatus for an all-optical processing, e.g., an optical gate processing by controlling an optical path of input light. For example, as a prior art for optically waveshaping an optical input on the order of subnanoseconds, a technique described in the reference entitled "Generation of Arbitrarily Shaped Optical Pulses in the Subnanosecond to Picosecond Region Using a Fast Electrooptic Deflector" (IEEE JOURNAL OF QUANTUM ELECTRONICS, VOL. QE-16, NO. 2, FEBRUARY 1980) is known. This optical waveshaping apparatus employs an electrooptic deflector (EOD) and a slit. An applied voltage to the EOD is changed in an AC manner while an input beam is incident on the EOD, and a deflected transmission beam is radiated on the slit, thereby obtaining a waveshaped output pulse from the light transmitted through an opening of the slit. Since this apparatus employs the EOD, an electrical signal must be used in deflection of an input beam, and various problems are inevitably posed in association with the electrical signal.

As a framing camera used in subnanosecond image framing, techniques described in Japanese Patent Laid-Open No. 64-60944 and in the reference entitled "Single-Frame and Double-Frame operation of a Picosecond framing camera" (Vol. 57, No. 6, Apr. 15, 1986) are known. In a gate apparatus in the conventional framing camera, spatial image information is converted into an electron beam by a photo cathode, and the electron beam is scanned by the deflector to pass through a slit. When the image information passes through the slit, it is converted into time-serial information. After the image information passes through the slit, the information is deflected again, and becomes spatial image information when it forms a fluorescent image on an output surface. In this apparatus, image information as light is temporarily converted into electron information, and the converted information is subjected to processing. Therefore, the photo cathode and the phosphor screen are indispensable, and sensitivity is inevitably decreased, thus causing various drawbacks. Since an electron tube which causes a decrease in resolution due to a space-charge effect is used, the apparatus is easily damaged. A high voltage must be applied, and a circuit is undesirably complicated.

SUMMARY OF THE INVENTION

It is an object of the present invention to provide an optical apparatus which can control an optical path of input light such as an optical image, a light beam, or the like directly using light, and can time-serially and spatially process the input light.

It is another object of the present invention to provide an optical apparatus comprising first and second deflection members, each of which is formed of a nonlinear optical material whose refractive index is changed upon light radiation, mask means arranged on an optical path extending from a front side of the first deflection member to a rear side of the second deflection member, and having a predetermined transmission pattern, pumping means for radiating first and second pumping light beams onto predetermined regions of the first and second deflection members, and changing the refractive indices of the predetermined regions to bend the optical path, and control means for variably controlling intensities of the first and second pumping light beams.

According to the optical apparatus, an optical path of light incident from the front side of the first deflection member is deflected by the first deflection member. The intensity of the deflected light is modulated by the mask means, and the modulated light emerges from the rear side of the second deflection member. When the intensities of the first and second pumping light beams to be radiated into the predetermined regions of the first and second deflection members are appropriately changed, light emerging from the rear side of the second deflection member corresponds to a spatial or time-serial processing result of light incident from the front side of the first deflection member. For example, when light incident from the front side of the first deflection member has no two-dimensional spread, this 0- or one-dimensional light can be waveshaped to have a desired time waveform by adjusting the first and second pumping light beams. When light incident from the front side of the first deflection member has a two-dimensional spread, the two-dimensional light can be desirably gated by adjusting the first and second pumping light beams. As a result, various spatial and time-serial processing operations such as enlargement can be performed.

It is still another object of the present invention to provide an optical waveshaping apparatus which comprises the above-mentioned optical apparatus, and converts input light incident from the front side of the first deflection member into output light which is waveshaped in terms of its intensity so as to output the waveshaped light from the rear side of the second deflection member.

It is still another object of the present invention to provide an optical waveshaping apparatus which comprises first and second deflection members, each of which is formed of a nonlinear optical material whose refractive index is changed upon light radiation, mask means arranged on an optical path extending from a front side of the first deflection member to a rear side of the second deflection member, and having a predetermined transmission pattern, a pumping light source for radiating, onto side portions of the first and second deflection members, parallel first and second pumping light beams whose spatial spreads are selected so that each of radiation regions in the first and second deflection members has a three-dimensional shape (e.g., a triangular-prism shape) having two planes crossing each other, and pumping light intensity control means for variably controlling intensities of the first and second pumping light beams. The apparatus generates output light which is obtained by waveshaping input light incident from the front side of the first deflection member in terms of an intensity from the rear side of the second deflection member. The apparatus may further comprise pumping light split means for splitting single pumping light output from the pumping light source into first and second pumping light beams, so that an optical path of the second pumping light beam is longer than an optical path of the first pumping light beam by an amount corresponding to a distance between the first and second deflection members, and an opening of the pattern of the mask means may be variable.

According to the above-mentioned waveshaping apparatus, a deflection element having the three-dimensional shape such as a prism is equivalently formed in the deflection member upon radiation of pumping light, and input light is deflected by the deflection element. In this case, the input light is deflected by changing the intensity or radiation region of the pumping light. Therefore, a mask member having a predetermined pattern can be arranged in an optical path connecting the two deflection members, so that light can be waveshaped to have a desired time waveform using light. The waveform can be variably adjusted by the transmission pattern of the mask member. For this reason, the problems of the conventional apparatus which performs electrical processing can be thoroughly eliminated.

It is still another object of the present invention to provide an optical gate apparatus which comprises the above-mentioned optical apparatus, and generates an output image, corresponding to an input image incident from the front side of the first deflection member, from the rear side of the second deflection member.

It is still another object of the present invention to provide an optical gate apparatus which comprises first and second deflection members, each of which is formed of a nonlinear optical material whose refractive index is changed upon light radiation, a slit member arranged between the first and second deflection members, and having a slit having a predetermined width, a pumping light source for radiating, into the first and second deflection members in a direction substantially parallel to a longitudinal direction of the slit, parallel first and second pumping light beams whose spatial spreads are selected, so that each of radiation regions in the first and second deflection members has a three-dimensional shape (e.g., a triangular-prism shape) having two planes substantially parallel to the longitudinal direction of the slit, and crossing each other, and pumping light intensity control means for variably controlling intensities of the first and second pumping light beams. The apparatus and which causes an output surface arranged behind the second deflection member to generate an output image corresponding to an input image incident from the front side of the first deflection member. A limiter window having, e.g., a triangular opening including two sides corresponding to the two planes which cross each other may be arranged on a pumping light output side of the pumping light source, or the apparatus may further comprise pumping light split means for splitting single pumping light output from the pumping light source into first and second pumping light beams, so that an optical path of the second pumping light beam is longer than an optical path of the first pumping light beam by an amount corresponding to a distance between the first and second deflection members.

According to the optical gate apparatus, a deflection element having the three-dimensional shape such as a prism is equivalently formed in the deflection member upon radiation of pumping light. At this time, when the pumping light intensity or the radiation region is time-serially changed, a deflection angle is changed, and light from an input image is deflected. Therefore, when the slit is arranged between the deflection members, light can be gated using light (optical-optical gated).

For this reason, the problems of the conventional apparatus which performs electrical processing can be thoroughly eliminated.

It is still another object of the present invention to provide an optical gate apparatus which comprises, in addition to the same first and second deflection members and the same slit member as those described above, a pumping light source for radiating parallel first and second pumping light beams into the first and second deflection members from a direction substantially parallel to the longitudinal direction of the slit, pumping light limitter means having limitter windows for selecting spatial spreads of the first and second pumping light beams, so that each of radiation regions of the first and second pumping light beams in the first and second deflection members has a three-dimensional shape having two planes substantially parallel to the longitudinal direction of the slit and crossing each other, and limitter window control means for variably controlling a crossing angle of two sides of each of the limitter windows, which sides correspond to the two planes which cross each other. The apparatus causes an output surface arranged behind the second deflection member to generate an output image corresponding to an input image incident from the front side of the first deflection member.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

FIGS. 2A to 2D are views showing operations of the apparatus shown in FIG. 1, in which FIG. 2A shows an optical path of an input beam when the intensity of pumping light is at the first level, FIG. 2B shows an optical path of an input beam when the intensity of pumping light is at the second level, FIG. 2C shows an optical path of an input beam when the intensity of pumping light is at the third level, and FIG. 2D shows an optical path of an input beam when the intensity of pumping light is at the fourth level;

FIGS. 4A and 4B show the relationship between an input beam and an output pulse, in which FIG. 4A shows a change in intensity of the input beam over time, and FIG. 4B shows a change in intensity of the output pulse over time;

FIGS. 10A to 10C are views showing operations of the apparatus shown in FIG. 9, in which FIG. 10A shows an optical path of an input image when the intensity of pumping light is at the first level, FIG. 10B shows an optical path of an input image when the intensity of pumping light is at the second level, and FIG. 10C shows an optical path of an input image when the intensity of pumping light is at the third level.

DESCRIPTION OF THE PREFERRED EMBODIMENT

An embodiment of the present invention will be described below with reference to the accompanying drawings.

(1) Optical Waveshaping Apparatus

Figure 1:
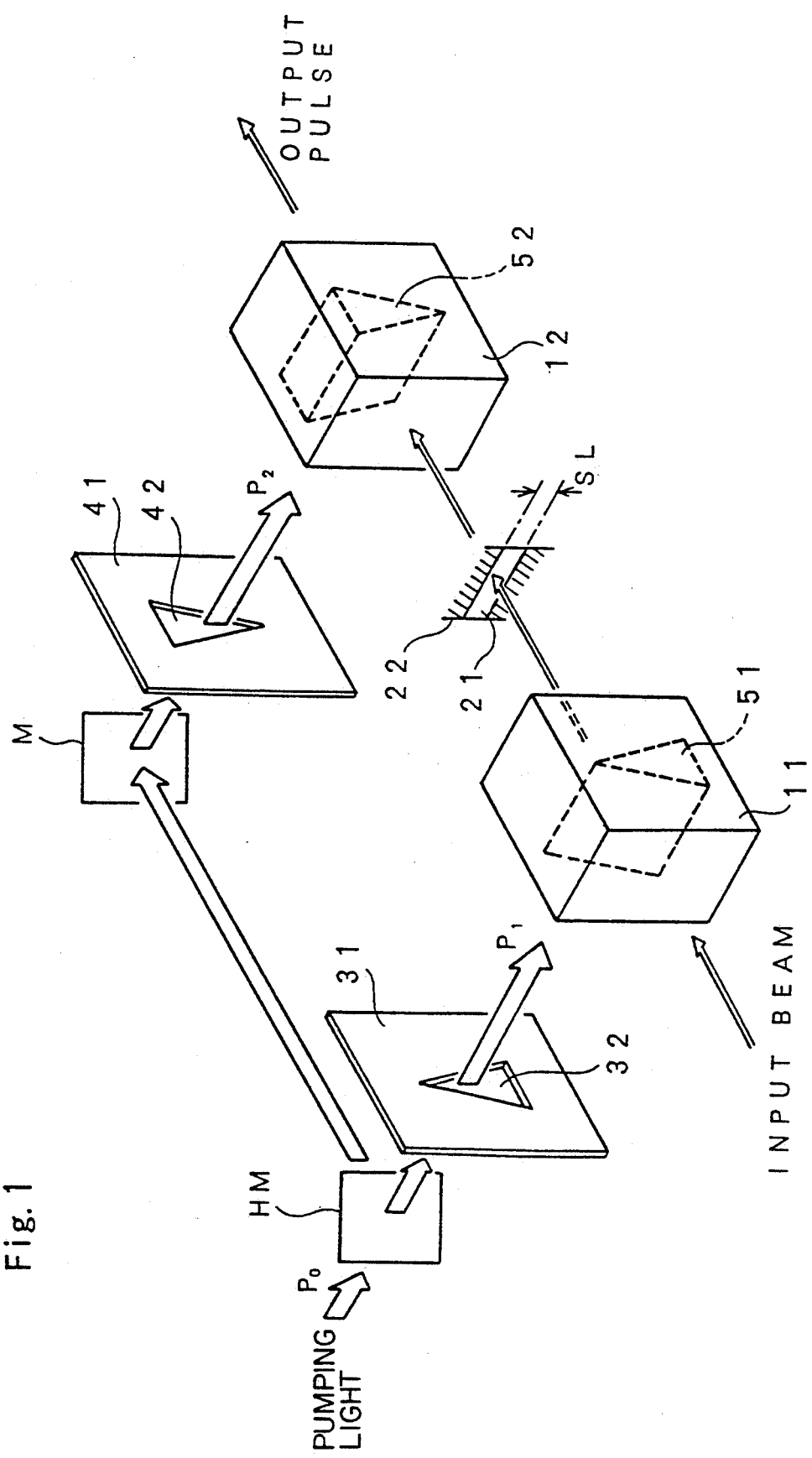
FIG. 1 is a perspective view of an optical waveshaping apparatus according to an embodiment of the present invention.
Figure 2A:
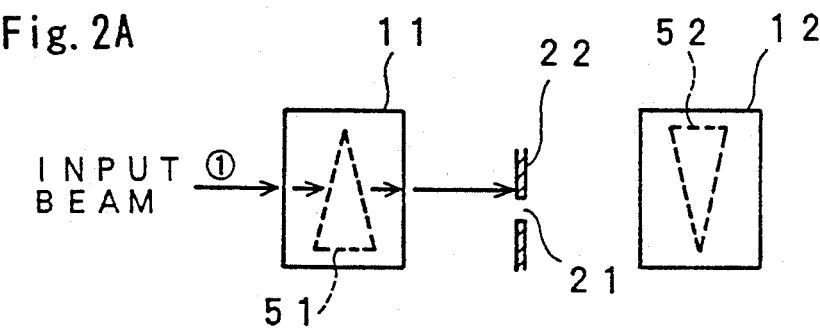
Figure 2B:
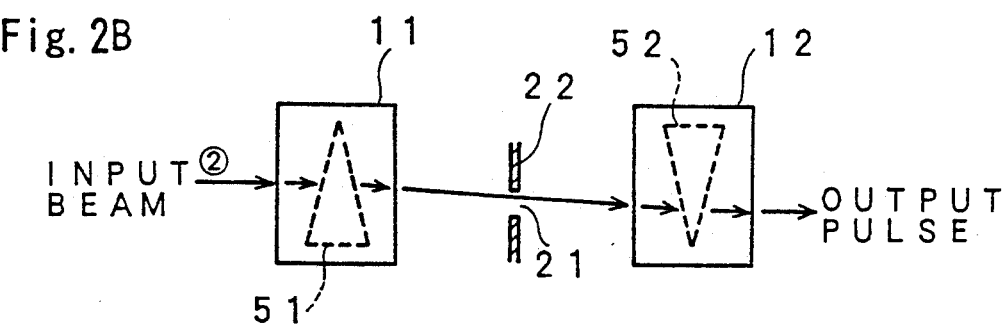
Figure 2C:
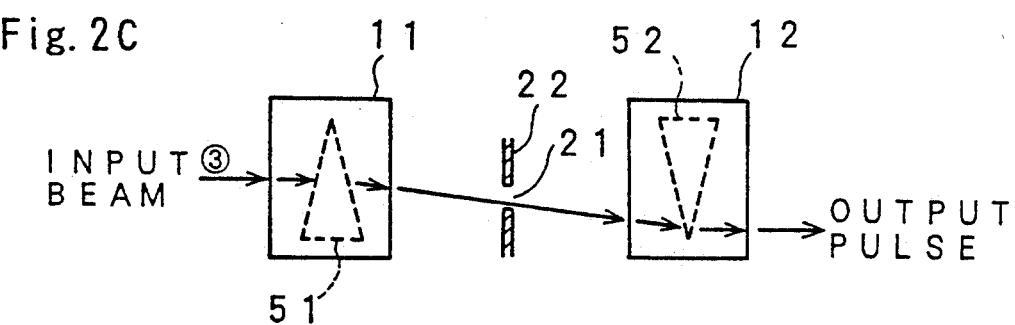
Figure 2D:
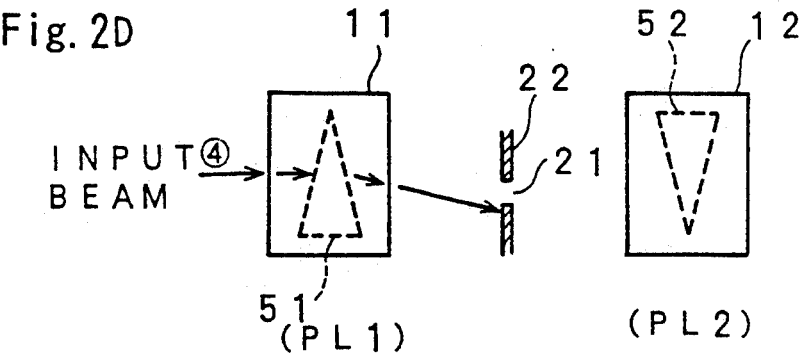

FIG. 1 shows an apparatus having a mask which has a slit-like pattern, as the simplest example. As shown in FIG. 1, a mask plate 22 having an aperture 21 of a width SL is arranged between first and second deflection members 11 and 12. The first deflection member 11 is formed of a nonlinear optical crystal such as lithium niobate ($LiNbO_3$), and has a shape. The second deflection member 12 has the same structure as the first deflection member 11. First and second limitter plates 31 and 41 are respectively set aside the first and second deflection members 11 and 12. Triangular openings 32 and 42 are respectively formed in the first and second limitter plates 31 and 41 in opposite directions. A half mirror HM and a total reflection mirror M are respectively arranged aside the first and second limitter plates 31 and 41. A pumping light source (not shown) for supplying pumping light $P_0$ is arranged aside the half mirror HM.

In the optical waveshaping apparatus with the above-mentioned structure, when the pumping light $P_0$ is incident from the pumping light source to the half mirror HM, some light components pass through the half mirror HM, and then pass through the opening 32 of the first limitter plate 31. The remaining light components of the light $P_0$ are reflected by the half mirror HM and the total reflection mirror M, and then pass through the opening 42 of the second limitter plate 41. In this manner, the pumping light components are respectively incident on the first and second deflection members 11 and 12 in a direction parallel to the longitudinal direction of the slit 21. A first pumping light beam $P_1$ incident on the first deflection member 11, and a second pumping light beam $P_2$ incident on the second deflection member 12 have the same spatial spreads in opposite directions. More specifically, since the openings 32 and 42 have the triangular shape, they define three-dimensional (triangular-prism) radiation regions each having two crossing planes parallel to the longitudinal direction of the aperture 21 of the mask plate 22 (in a direction perpendicular to the direction of the width SL) in the first and second deflection members 11 and 12. The triangular-prism radiation regions are formed in opposite directions in first and second radiation regions 51 and 52 of the first and second deflection members 11 and 12.

Each of the first and second deflection members 11 and 12 is formed of a nonlinear optical material which can exhibit a light-induced refractive index modulation. Therefore, the first and second radiation regions 51 and 52 have functions equivalent to a prism when the first and second pumping light beams $P_1$ and are radiated. For this reason, when an input beam in FIG. 1 is scanned to pass through the aperture 21 of the mask member 22, output pulses obtained by waveshaping the input beam can be obtained.

The functions and operations associated with the optical waveshaping effect described above will be described in detail below with reference to FIGS. 2A to 2D. As for the nonlinear optical material, not only a refractive index is changed upon radiation of pumping light, but also a refractive index value is increased/decreased according to an increase/decrease in intensity of the pumping light. For example, when the intensity of pumping light is increased, the triangular-prism radiation region equivalently serves as a prism comprising a material having a large refractive index. When the intensity of pumping light is decreased, the radiation region equivalently serves as a prism comprising a material having a small refractive index.

As shown in FIGS. 2A, 2B, 2C, and 2D, when the intensity of pumping light is increased stepwise like low level→middle level→high level→higher level, the refractive index of the constituting material of equivalent prisms PL1 and PL2 formed as the first and second radiation regions 51 and 52 formed in the first and second deflection members 11 and 12 also changes like small→middle→large→larger. Therefore, input beams ①, ②, ③, and ④ are scanned on the mask plate 22 by the equivalent prism PL1, and only the input beams ② and ③ pass through the aperture 21 of the mask plate 22. Thereafter, these beams are redeflected by the equivalent prism PL2, and are extracted as output pulses.

Figure 3:
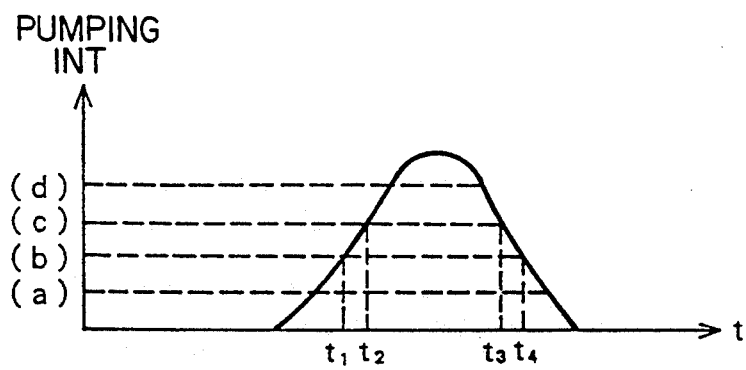
FIG. 3 is a graph showing a change in intensity of pumping light over time.
Figure 4A:
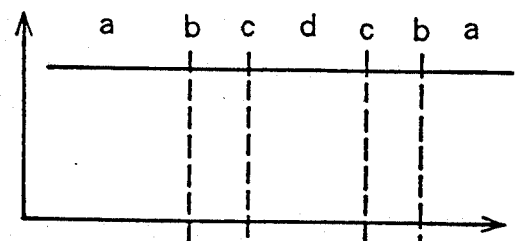
Figure 4B:
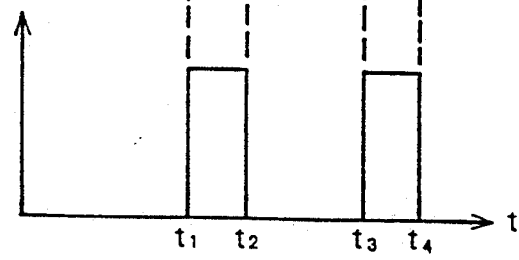
Figure 5:
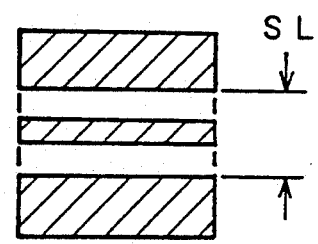
FIG. 5 shows a modification of a mask.
Figure 6:
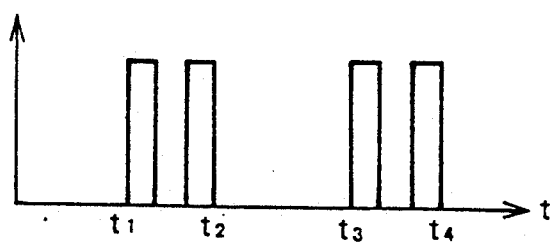
FIG. 6 is a graph showing a change in intensity of an output pulse over time when the mask shown in FIG. 5 is used.
Figure 7:
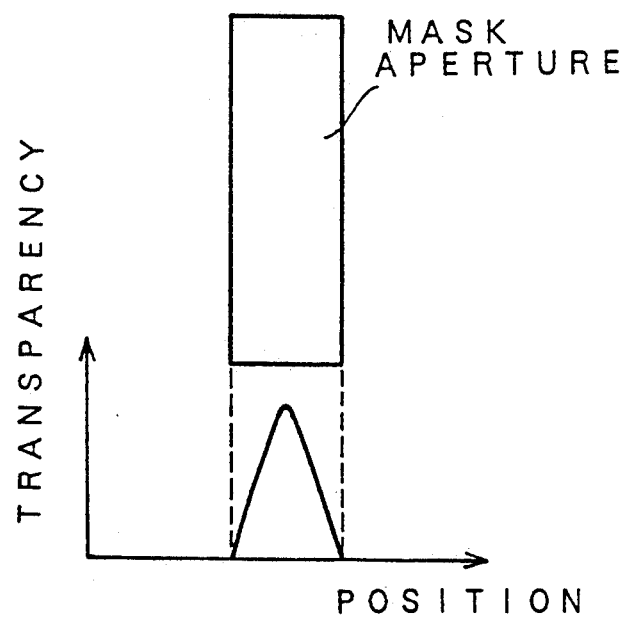
FIG. 7 shows a modification of a mask, and its transparency.

In this manner, an input beam is deflected by the equivalent prism PL1 formed as the first radiation region 51 in the first deflection member 11 by the first pumping light $P_1$, and is extracted by the aperture 21 of the mask plate 22. Therefore, the extracted time width of the input beam becomes equal to a time required for light to cross the aperture 21. Since the light passing through the aperture 21 is deflected in the opposite direction by the equivalent prism PL2 formed as the second radiation region 52 in the second deflection member 12 by the second pumping light $P_2$, the output from the prism PL2 becomes pulse light waveshaped by the time width determined by the width of the aperture 21 and a deflection speed of the equivalent prism PL1. When a change in intensity of the pumping light over time is as shown in FIG. 3, changes in intensity of an output pulse over time when the input beam is CW light is as shown in FIGS. 4A and 4B. In FIG. 3 and FIGS. 4A and 4B, (a) to (d) correspond to the input beams ①, ②, ③, and ④ shown in FIG. 2. In the above description, the mask pattern 22 has the simplest slit shape. For example, when a mask for further dividing the aperture 21, as shown in FIG. 5, is used, output light shown in FIG. 6 can be obtained. In this manner, an output light waveform can be changed depending on the mask pattern. Even when a mask pattern is a slit shape, if it has a transparency distribution, various light waveforms can be output. For example, when a mask pattern has a transparency distribution, of FIG. 7, a triangular-wave light output can be obtained. If the transparency distribution has a difference in upper and lower portions of FIG. 7, a function equivalent to a mask having a triangular opening can be provided.

Of the pumping light $P_0$, light components passing through the half mirror HM are incident on the first deflection member 11 as the first pumping light $P_1$, and light components reflected by the half mirror HM are reflected again by the total reflection mirror M to be incident on the second deflection member 12 as the second pumping light $P_2$. Therefore, a propagation time difference from when an input beam is incident on the first deflection member 11 until it is incident on the second deflection member 12 is adjusted to be equal to a propagation time difference from when the first pumping light $P_1$ is incident on the first deflection member 11 until the second pumping light $P_2$ is incident on the second deflection member 12.

In the above embodiment, if the intensities of the first and second pumping light beams $P_1$ and $P_2$ radiated on the first and second deflection members 11 and 12 have different time waveforms, an input beam can be swept at different speeds by the equivalent prisms PL1 and PL2 formed as the first and second radiation regions 51 and 52. Therefore, a waveform of output light can be changed. Even when the waveform of the intensity of the pumping light $P_0$ is fixed, if the openings 32 and 42 of the first and second limitter plates 31 and 41 are changed their patterns, an input beam can be similarly swept at different speeds by the equivalent prisms PL1 and PL2 formed as the first and second radiation regions 51 and 52. More specifically, a crossing angle defined by two crossing plates where an input beam passes (i.e., a vertex angle of the equivalent prism), can be changed by changing a crossing angle of two sides of each of the openings 32 and 42 of the first and second limitter plates 31 and 41.

In the above embodiment, the aperture 21 of the mask plate 22 may be variable. In this manner, the waveform of the output light can be variably charged. The variable mask is constituted as follows. That is, a polarizer is arranged in front of the mask plate 22, the mask plate 22 is constituted by an array of Pockels cells, and an analyzer having the same polarization direction as that of the polarizer is arranged behind the mask plate 22. A voltage is applied to the array of Pockels cells to form an arbitrary transmission pattern. For example, a voltage may be applied, so that a plane of polarization of transmission light at a mask portion of the mask plate 22 is rotated through 90° with respect to a portion corresponding to the aperture 21 of the mask plate 22.

Figure 8:
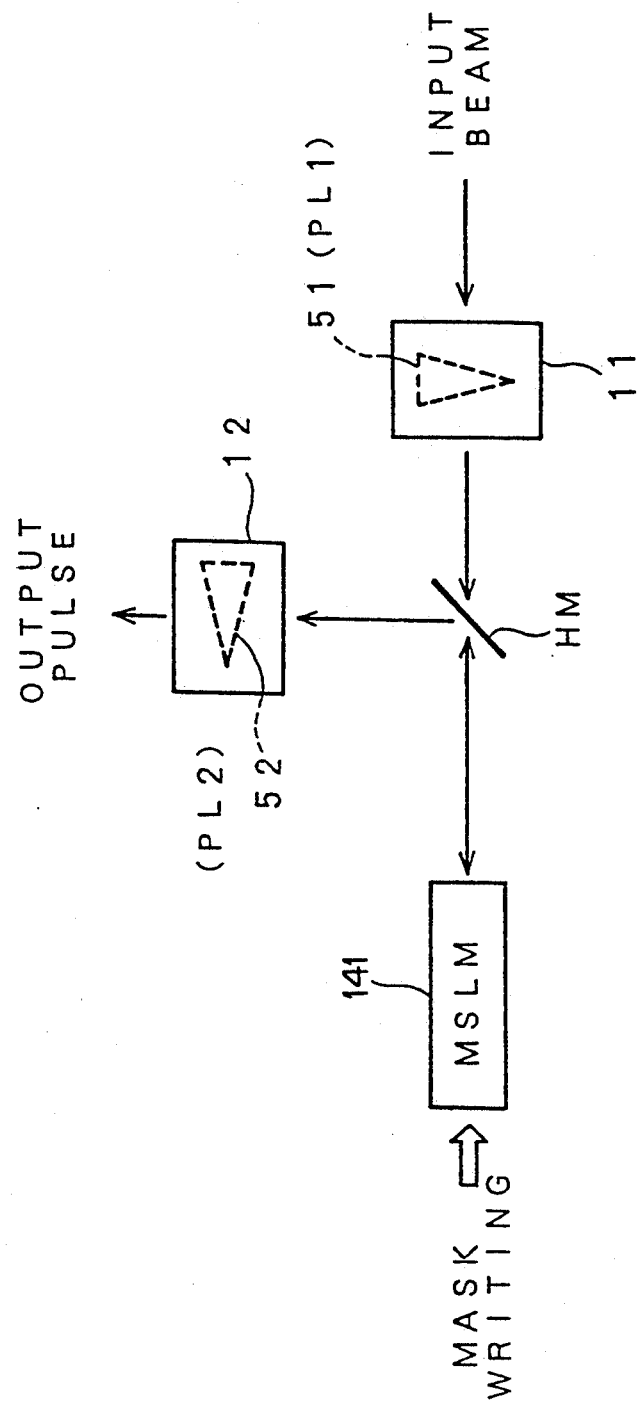
FIG. 8 is a diagram of an optical waveshaping apparatus using an MSLM.

The mask means may be constituted by using a spacial light modulator like a Microchannel Spacial light modulator tube (MSLM) in place of the mask plate 22 in the above embodiment. FIG. 8 shows an arrangement in this case. As shown in FIG. 8, a half mirror HM is arranged on an optical path between the equivalent prisms PL1 and PL2, so that an input beam passing through the half mirror HM is incident on an MSLM 141. The MSLM 141 can equivalently form a transmission mask by mask writing light. Therefore, output light propagating from the MSLM 41 toward the half mirror HM is equivalent to light propagating toward the rear side of the mask plate 22 in FIG. 1. For this reason, the output light is reflected by the half mirror HM to pass through the equivalent prism half mirror HM to pass through the equivalent prism PL2, thus obtaining the same output pulse as in the embodiment shown in FIG. 1. Since the transmission mask formed by the MSLM 141 can be easily changed by changing a pattern of mask writing light, the waveform of an output pulse can be easily changed.

(2) Optical Gate Apparatus

Figure 9:
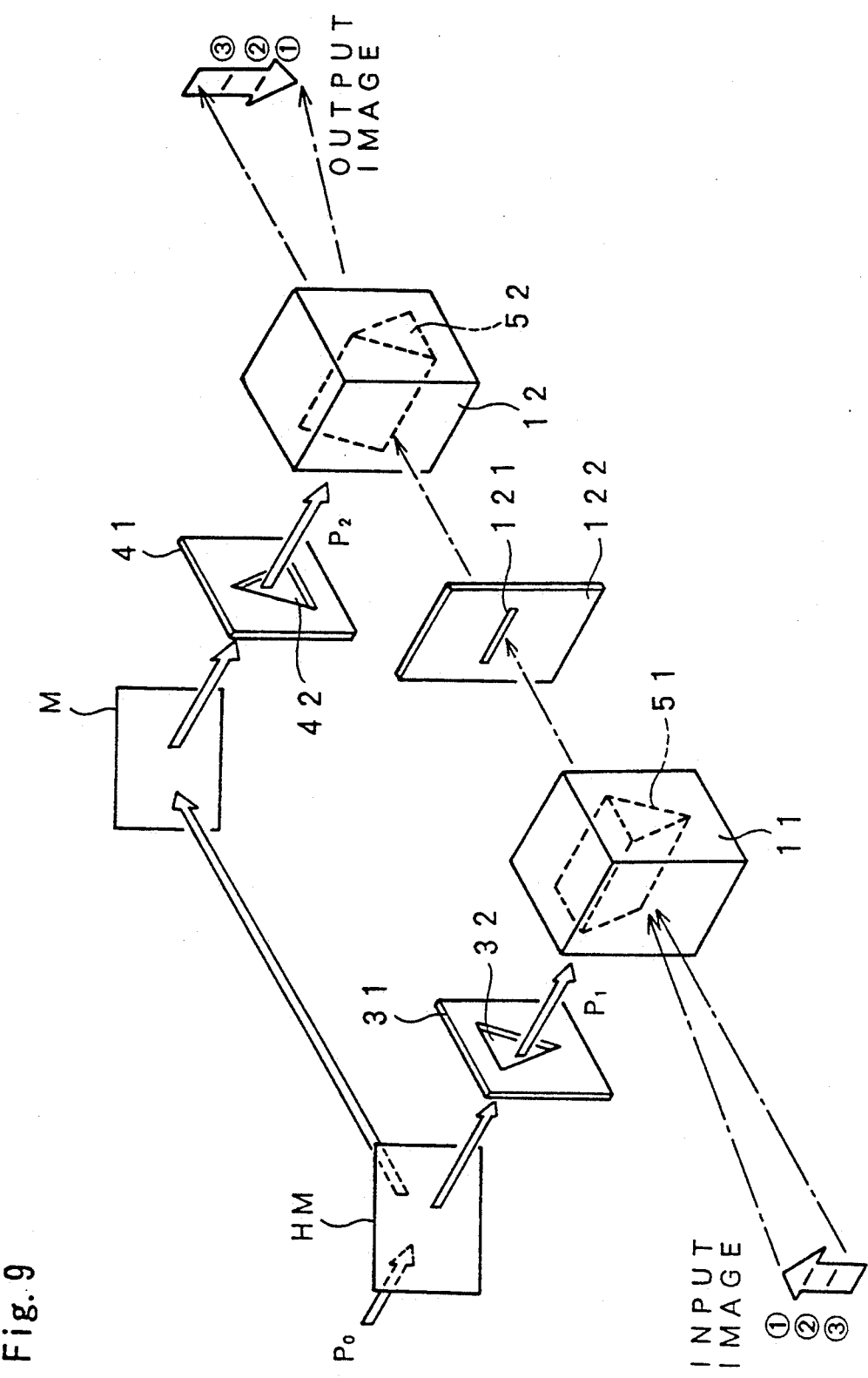
FIG. 9 is a perspective view of an optical gate apparatus according to another embodiment of the present invention.

As shown in FIG. 9, a slit plate 122 having a slit 121 is arranged between first and second deflection members 11 and 12. The first deflection member 11 is formed of a nonlinear optical crystal such as $LiNbO_3$, and has a rectangular-prism shape. The second deflection member 12 has the same structure as the first deflection member 11. First and second limitter plates 31 and 41 are respectively set aside the first and second deflection members 11 and 12. Triangular openings 32 and 42 are respectively formed in the first and second limitter plates 31 and 41 in opposite directions. A half mirror HM and a total reflection mirror M are respectively arranged aside the first and second limitter plates 31 and 41. A pumping light source (not shown) for supplying pumping light $P_0$ is arranged aside the half mirror HM.

In the optical gate apparatus with the above-mentioned structure, when the pumping light $P_0$ is incident from the pumping light source to the half mirror HM, some light components pass through the half mirror HM, and then pass through the opening 32 of the first limitter plate 31. The remaining light components of the light $P_0$ are reflected by the half mirror HM and the total reflection mirror M, and then pass through the opening 42 of the second limitter plate 41. In this manner, the pumping light components are respectively incident on the first and second deflection members 11 and 12 in a direction parallel to the longitudinal direction of the slit 121. A first pumping light beam $P_1$ incident of the first deflection member 11, and a second pumping light beam $P_2$ incident on the second deflection member 12 have the same spatial spreads in opposite directions. More specifically, since the openings 32 and 42 have the triangular shape, they define three-dimensional (triangular-prism) radiation regions each having two crossing planes parallel to the longitudinal direction of the slit 121 in the first and second deflection members 11 and 12. The triangular-prism radiation regions are formed in opposite directions as first and second radiation regions 51 and 52 in the first and second deflection members 11 and 12.

Each of the first and second deflection members 11 and 12 is formed of a nonlinear optical material which can exhibit an light-induced refractive index modulation. Therefore, the first and second radiation regions 51 and 52 have functions equivalent to a prism when the first and second pumping light beams $P_1$ and $P_2$ are radiated. For this reason, an input image as spatial information in FIG. 9 is time-serially scanned in the order of ①, ②, and ③ to pass through the slit 121, and an output image corresponding to the input image can be expressed as spatial information on an output surface (not shown).

The functions and operations associated with the above-mentioned optical-optical gate effect will be described in detail below with reference to FIGS. 10A, 10B, and 10C.

As for the nonlinear optical material, not only a refractive index is changed upon radiation of pumping light, but also a refractive index value is changed in accordance with an increase/decrease in intensity of pumping light. For example, when the intensity of pumping light is increased, since the refractive index of the triangular-prism radiation region is largely changed, an image is largely shifted. When the intensity of pumping light is decreased, since a change in refractive index is small, an image is shifted slightly.

Figure 10A:
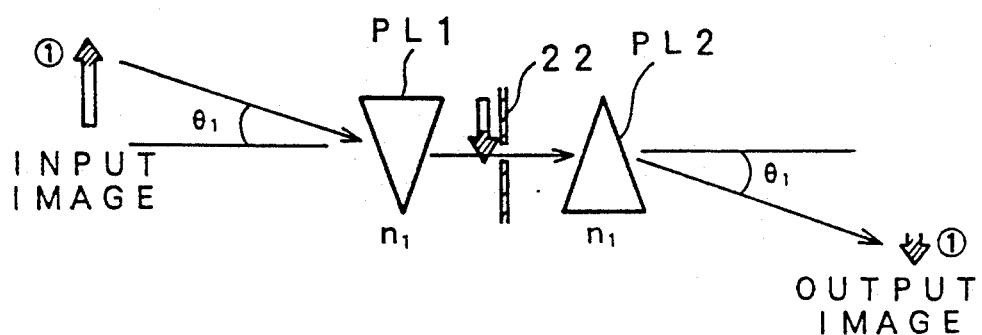
Figure 10B:
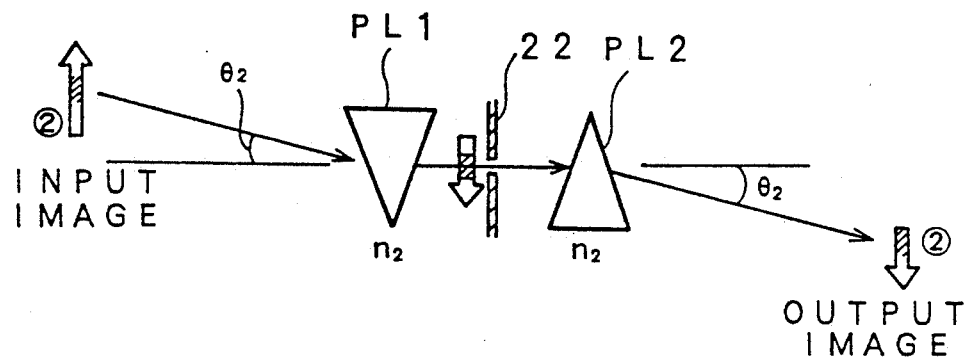
Figure 10C:
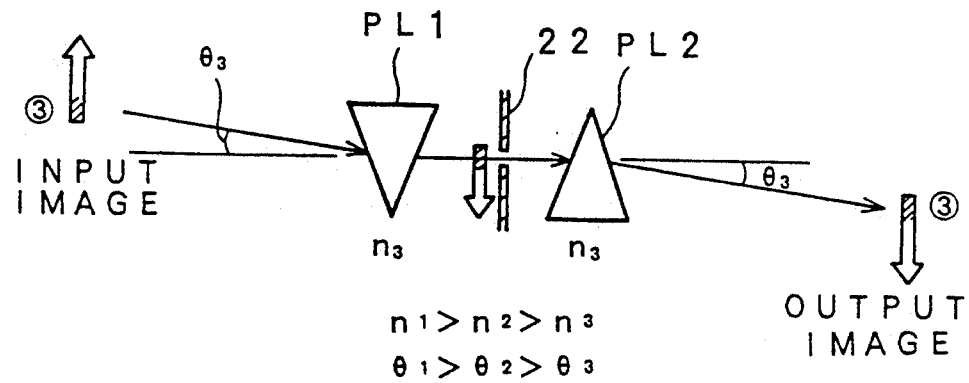

As shown in FIGS. 10A, 10B, and 10C, when the intensity of pumping light is gradually increased like high level→middle level→low level, the refractive index of the constituting material of equivalent prisms PL1 and PL2 by the first and second radiation regions 51 and 52 formed in the first and second deflection members 11 and 12 is also changed like large→middle→small, and an image shift amount is changed like large→middle→small accordingly. Therefore, input images ①, ②, and ③ of spatial information time-serially pass through the slit 121 by the equivalent prism PL1, and are reconverted into spatial information by the equivalent prism PL2. Thereafter, the spatial information appears as an output image on the output surface.

In this manner, light from an input image is deflected by the equivalent prism PL1 formed as the first radiation region 51 in the first deflection member 11 by the first pumping light $P_1$, and is sampled by the slit 121. Therefore, the extracted time width of each picture element of the input image becomes equal to a time required for light to cross the slit 121. Light having time-serial image information after it passes through the slit 121 is deflected in the opposite direction by the equivalent prism PL2 formed as the second radiation region 52 in the second deflection member 12 by the second pumping light $P_2$, and is reconverted into spatial image information. Therefore, the output image corresponds to an image gated by the time width determined by the width of the slit 121 and deflection speeds of the equivalent prisms PL1 and PL2.

Of the pumping light $P_0$, light components passing through the half mirror HM are incident on the first deflection mirror 11 as the first pumping light $P_1$, and light components reflected by the half mirror HM are reflected again by the total reflection mirror M to be incident on the second deflection member 12 as the second pumping light $P_2$. Therefore, a propagation time difference from when an input beam is incident on the first deflection member 11 until it is incident on the second deflection member 12 is adjusted to be equal to a propagation time difference from when the first pumping light $P_1$ is incident on the first deflection member until the second pumping light $P_2$ is incident on the second deflection member 12. The openings 32 and 42 of the first and second limitter plates 31 and 41 are formed in the opposite directions, but may be formed in the same direction. In this case, an output image appears in the same manner as an input image. The first and second deflection members may have different deflection speeds. In this case, an output gated image becomes an image enlarged or reduced in a sweeping direction.

In this embodiment, the deflection angles of the equivalent prisms PL1 and PL2 by the first and second radiation regions 51 and 52 are equivalently changed by changing the intensities of the first and second pumping light beams $P_1$ and $P_2$ to be radiated on the first and second deflection members 11 and 12. Even when the intensity of the pumping light $P_0$ is fixed, if the openings 32 and 42 of the first and second limitter plates 31 and 41 are changed their patterns, the deflection angles of the equivalent prisms PL1 and PL2 can be similarly changed. More specifically, a crossing angle defined by two crossing plates of the equivalent prism where light from an input image passes can be changed by changing a crossing angle of two sides of each of the openings 32 and 42 of the first and second limitter plates 31 and 41. It is difficult to mechanically change patterns of the openings or windows of the first and second limitter plates 31 and 41 since a very high-speed operation is required. However, if a crystal capable of electrically switching between a light transmission state and a light shielding state is used, the patterns of the windows can be changed.

The above embodiment relates to an optical gate camera, but may be applied to an optical framing camera by arranging a plurality of slits in the slit member.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. An optical apparatus comprising:
a first deflection member formed of a nonlinear optical material having a refractive index which changes based on an intensity of a first control light beam incident thereon, the first deflection member having at least first, second and third sides, and the first side being adapted to receive an input light signal;
a second deflection member formed of a nonlinear optical material having a refractive index which changes based on an intensity of a second control light beam incident thereon, the second deflection member having at least first, second and third sides;
mask means, disposed in an information optical path from the third side of the first deflection member to the first side of second deflection member, for transmitting a predetermined pattern of light emitted from the third side of the first deflection member to the first side of the second deflection member;
first means for emitting the first control light beam on a first region of the first deflection member, the first control light beam being incident on the second side of the first deflection member;
second means for emitting the second control light beam on a second region of the second deflection member, the second control light beam being incident on the second side of the second deflection member, and said second region being defined by 180 degrees rotation of said first region around a predetermined axis, said predetermined axis being on a plane defined by a vector for a path of the input light signal and a vector for a direction of the first control light beam and going through a predetermined point between said first deflection member and said second deflection member; and
control means for controlling intensities of the first and second control light beams.

2. An optical waveshaping apparatus, comprising an optical apparatus of claim 1, for converting input light incident on the first side of the first deflection member into output light which is waveshaped in terms of an intensity, and generating the output light from the third side of said second deflection member.

3. An apparatus according to claim 2, wherein said mask means comprises spatial light modulator means for changing a pattern of light incident thereon according to a mask-writing signal.

4. An apparatus according to claim 2, wherein the first deflection member, second deflection member and the mask means are linearly arranged so that an input light incident on the first side of the first deflection member and emerging as an output light from the third side of the second deflection member has a first optical path which is linear; and the first and second means include optical means for directing the first and second control light beams along second and third optical paths, respectively, from a pumping light source to the first and second deflection members in a direction perpendicular to the first optical path, and first and second limiter means arranged in the first and second optical paths, the first and second limiter means having openings for defining the first and second regions to be irradiated with the first and second control light beams.

5. An apparatus according to claim 4, wherein said first and second limiter means have triangular openings which define prism-like first and second regions having an axis extending in a direction perpendicular to the first optical path.

6. An apparatus according to claim 4, wherein a pattern of each of the openings of the first and second limitter means is variable.

7. An apparatus according to claim 4, wherein said optical means splits a single pumping light emerging from said pumping light source into the first and second control light beams, and sets the third optical path longer than the second optical path by an amount corresponding to a distance between said first and second deflection members.

8. An apparatus according to claim 2, wherein the first deflection member, second deflection member and the mask means are linearly arranged so that an input light incident on the first side of the first deflection member and emerging as an output light from the third side of the second deflection member has a first optical path which is linear; and the first and second means include a pumping light source for generating the first and second control light beams, optical means for directing the first and second control light beams along second and third optical paths, respectively, from said pumping light source to said first and second deflection members in a direction perpendicular to the first optical path, and first and second filter means, arranged in the first and second optical paths of the first and second control light beams, respectively, for spatially nonuniformly adjusting radiation intensities of the first and second control light beams to the first and second regions.

9. An apparatus according to claim 8, wherein the first and second filter means have a transparent region and the transparent region is variable.

10. An apparatus according to claim 8, wherein said optical means splits a single pumping light emerging from said pumping light source into the first and second control light beams, and sets the third optical path to be longer than the second optical path by an amount corresponding to a distance between said first and second deflection members.

11. An optical gate apparatus, comprising an optical apparatus of claim 1, for generating an output image corresponding to an input image incident on the first side of said first deflection member, from the third side of said second deflection member.

12. An apparatus according to claim 11, wherein said mask means has a slit.

13. An apparatus according to claim 12, wherein a width of the slit is variable.

14. An apparatus according to claim 11, wherein said mask means comprises spatial light modulator means for changing a pattern of light incident thereon according to a mask-writing signal.

15. An apparatus according to claim 11, wherein the first deflection member, second deflection member and the mask means are linearly arranged so that an input light incident on the first side of the first deflection member and emerging as an output light from the third side of the second deflection member has a first optical path which is linear; and the first and second means include optical means for directing the first and second control light beams along second and third optical paths, respectively, from a pumping light source to the first and second deflection members in a direction perpendicular to the first optical path, and first and second limiter means arranged in the first and second optical paths, the first and second limiter means having openings for defining the first and second regions to be irradiated with the first and second control light beams.

16. An apparatus according to claim 15, wherein said first and second limiter means have triangular openings which define prism-like first and second regions having an axis extending in a direction perpendicular to the first optical path.

17. An apparatus according to claim 15, wherein a pattern of each of the openings of the first and second limitter means is variable.

18. An apparatus according to claim 15, wherein said optical means splits a single pumping light emerging from said pumping light source into the first and second control light beams, and sets the third optical path longer than the second optical path by an amount corresponding to a distance between said first and second deflection members.

19. An apparatus according to claim 11, wherein the first deflection member, second deflection member and the mask means are linearly arranged so that an input light incident on the first side of the first deflection member and emerging as an output light from the third side of the second deflection member has a first optical path which is linear; and the first and second means include a pumping light source for generating the first and second control light beams, optical means for directing the first and second control light beams along second and third optical paths, respectively, from said pumping light source to said first and second deflection members in a direction perpendicular to the first optical path, and first and second filter means, arranged in the first and second optical paths of the first and second control light beams, respectively, for spatially nonuniformly adjusting radiation intensities of the first and second control light beams to the first and second regions.

20. An apparatus according to claim 19, wherein the first and second filter means have a transparent region and the transparent region is variable.

21. An apparatus according to claim 19, wherein said optical means splits a single pumping light emerging from said pumping light source into the first and second control light beams, and sets the third optical path to be longer than the second optical path by an amount corresponding to a distance between said first and second deflection members.

22. An apparatus according to claim 1, wherein said mask means comprises spatial light modulator means for changing a pattern of light incident thereon according to a mask-writing signal.

23. An apparatus according to claim 1, wherein
the first deflection member, second deflection member and the mask means are linearly arranged so that an input light incident on the first side of the first deflection member and emerging as an output light from the third side of the second deflection member has a first optical path which is linear; and
the first and second means include optical means for directing the first and second control light beams along second and third optical paths, respectively, from a pumping light source to the first and second deflection members in a direction perpendicular to the first optical path, and first and second limiter means arranged in the first and second optical paths, the first and second limiter means having openings for defining the first and second regions to be irradiated with the first and second control light beams.

24. An apparatus according to claim 3, wherein said first and second limiter means have triangular openings which define prism-like first and second regions having an axis extending in a direction perpendicular to the first optical path.

25. An apparatus according to claim 3, wherein a pattern of each of the openings of the first and second limitter means is variable.

26. An apparatus according to claim 3, wherein said optical means splits a single pumping light emerging from said pumping light source into the first and second control light beams, and sets the third optical path longer than the second optical path by an amount corresponding to a distance between said first and second deflection members.

27. An apparatus according to claim 1, wherein the first deflection member, second deflection member and the mask means are linearly arranged so that an input light incident on the first side of the first deflection member and emerging as an output light from the third side of the second deflection member has a first optical path which is linear; and
the first and second means include a pumping light source for generating the first and second control light beams, optical means for directing the first and second control light beams along second and third optical paths, respectively, from said pumping light source to said first and second deflection members in a direction perpendicular to the first optical path, and first and second filter means, arranged in the first and second optical paths of the first and second control light beams, respectively, for spatially nonuniformly adjusting radiation intensities of the first and second control light beams to the first and second regions.

28. An apparatus according to claim 8, wherein the first and second filter means have a transparent region and the transparent region is variable.

29. An apparatus according to claim 8, wherein said optical means splits a single pumping light emerging from said pumping light source into the first and second control light beams, and sets the third optical path to be longer than the second optical path by an amount corresponding to a distance between said first and second deflection members.

30. An apparatus according to claim 1, wherein said mask means has a slit.

31. An apparatus according to claim 30, wherein a width of the slit is variable.

* * * * *